Dec. 7, 1965  A. PITNER  3,221,874
PRESENTATION OR PACKING OF ROLLER, NEEDLE
AND BALL BEARINGS AND THE LIKE
Filed Jan. 14, 1963
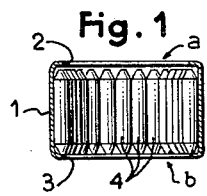
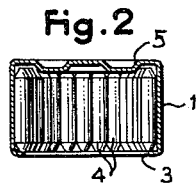
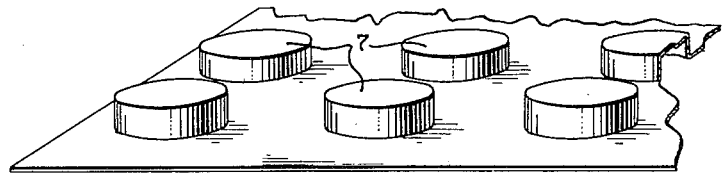
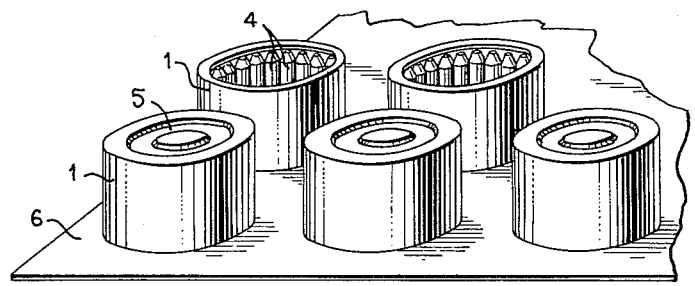
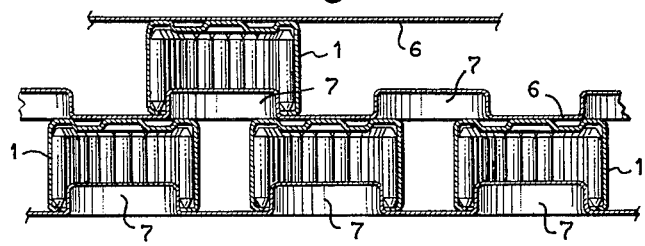
INVENTOR
Alfred Pitner, ent Office 3,221,874
Patented Dec. 7, 1965

3,221,874
PRESENTATION OR PACKING OF ROLLER, NEEDLE AND BALL BEARINGS AND THE LIKE
Alfred Pitner, Paris, France, assignor to Nadella Societe Anonyme, Seine-et-Oise, France, a corporation of France
Filed Jan. 14, 1963, Ser. No. 251,125
Claims piority, application France, Apr. 6, 1962, 893,699
6 Claims. (Cl. 206—65)

The present invention relates to the presentation or packing of roller, needle or ball bearings and in particular to supports for bearings to be presented having the following numerous advantages.

The invention is particularly of interest in the supply of large batches of articles for high-consumption manufactured goods such as automobiles.

The bearings to be presented or packed according to the invention consist of a cylindrical outer ring open at both ends or at only one end, the other end having a transverse end wall, and one or a plurality of cylindrical rows of rollers or needles, or one or a plurality of circular rows of balls, which are free or retained by one or a plurality of cages or other means.

The support according to the invention comprises a sheet or thin slab having a series of studs or calibrated cylindrical projections whose dimensions are such that each of them is capable of fitting inside the bearing to be packed without clearance or with a slightly tight fit.

The following are some of the advantages of such a support:

The rollers, needles or balls are retained in the outer ring in the event that these rolling elements are not effectively retained by a cage or other means.

The bearing is protected against entry of foreign bodies or harmful substances, at least as concerns one end of the outer ring.

Correct orientation of such a bearing indicated by the manufacturer to the user when the bearing has a special fitting direction.

The ease of handling of a set of several bearings.
The number of bearings is easily counted.
Compact packing is possible.
The bearings packed are shielded against blows.
If desired, the support can be transparent, which permits a visual checking of the interior of the bearings.

Further features and advantages of the invention will be apparent from the ensuing description, with reference to the accompanying drawings to which the invention is in no way limited.

In the drawings:
FIG. 1 is an axial sectional view of a bearing having an outer ring open at both ends;
FIG. 2 is a view similar to FIG. 1 of a bearing having a cup-shaped outer ring;
FIG. 3 is a partial perspective view of an embodiment of a support;
FIG. 4 is a partial perspective view of the support shown in FIG. 3 on which are mounted a row of bearings having outer rings open at both ends, and a row of bearings having a cup-shaped outer ring, and
FIG. 5 is a partial axial sectional view through a stack of several supports.

FIG. 1 shows a needle bearing having an outer ring 1 which is open at both ends but has, if desired, inner flanges 2 and 3 and in which ring are disposed the needles 4 which are free or disposed in the apertures of a cage (not shown). The needles can be prevented from escaping from the ring when handling by means of a cage or other means, such as the cylindrical inner flanges 2 and 3 or even merely set grease.

FIG. 2 shows a similar bearing in which the outer ring 1 is closed at one end by a bottom or transverse wall 5 so that this outer ring is in the shape of a cup.

The support for presenting or packing these bearings is shown in FIG. 3. It comprises a sheet or thin slab 6 having a series of studs or cylindrical projections 7 whose diameter is such that they are capable of fitting inside the bearing shown in FIG. 1 or FIG. 2 without clearance or with a slightly tight fit.

FIG. 4 shows the bearings in position on the support.
It has been supposed that one row of studs receives the bearings having an outer ring open at both ends and another row receives the bearings having a cup-shaped outer ring.

If the needles 4 (or rollers or balls) are not retained by a cage or other means but merely for example by set grease, this is a hazardous solution, above all if the surrounding temperature is high and decreases the viscosity of the grease. The needles or the like are consequently liable to fall out of the outer ring when handling. The studs 7 in this case constitute retaining plugs preventing the escape of the needles or the like when handling.

In any case, whether the bearing be provided with a needle-retaining cage or the like or not, it is well to prevent, before the bearing is mounted, entry into the bearing of filings, foreign bodies or substances harmful to the correct operation of the bearing; thus the studs perform the function of protecting plugs.

In certain applications, the bearing ring or the housing for receiving the ring is so constructed that there is a given direction for fitting the bearing (for example, the bearing shown in FIG. 1 must be fitted end $a$ first and not the end $b$). It is easy for the bearing manufacturer to fit the bearings onto the studs 7 in such direction that the ends $a$ are all situated on the same side of the ball bearings and advise the user of this fact so that the user has merely to follow the instructions of the manufacturer without need to turn the bearings round when mounting these bearings. It will be understood that this manner of presenting or packing the bearings renders the mounting thereof much more easy and sure than if the bearings were delivered in a haphazard mass.

The handling of the bearings fitted on the series of studs of a given support is very practical above all if they are small. The support can carry the exact number of a series of bearings (which may be identical or different from each other) corresponding to a given assembly stage of a manufactured article (for example the Cardan shafts of an automobile as the assembly line passes through the corresponding assembly station).

This arrangement also facilitates the counting of the bearings when packing at the factory, the counting of the number of bearings in stock and the supply of the stock by the stores to the workshop, it being clear that the number of units to count is divided by the number of bearings fitted on a support.

The marking on the support of the features of the bearings permits identifying these bearings even when the package which contained the bearings is no longer to hand.

The supports lend themselves to a compact packing since the studs can be brought together to the maximum extent. If desired, the support can be of flexible material so as to be foldable or curved so that the bearings, which would be in contact or almost in contact with each other, can be more easily taken hold of.

Further, when stacking supports carrying the bearings (FIG. 5) in boxes or cases for dispatch, the bearings are, on the one hand, maintained spaced apart owing to their centering on the studs and, on the other hand, isolated from the bearings carried by the supports situated above and below and are consequently protected from damage in the case of sudden blows when handling.

The support could advantageously be composed of transparent material so as to permit a visual inspection of the contents of the ring or cup.

The supports can have a rectangular, circular or other shape. The studs can be disposed in accordance with a quadrille system or in staggered relation to each other. The studs can be obtained, depending on the material of which the support is composed, by for example a press operation, moulding or suction, the supports being for example of thin metal such as aluminium, or paper, cardboard, impregnated fabric or moulded rubber. However, the use of cheap transparent and flexible plastic is generally preferred. The material employed is preferably resistant to the action of greases or hydrocarbons and it must be chemically inert relative to the metals of which the bearings are composed. The support, irrespective of its nature, could be if desired covered by or impregnated with an anti-rust product.

The extent to which the studs project from the support can be such that each stud completely fills the interior of the bearing (for example if the ring is open at both ends) or occupies only a fraction of the length of the bearing (for example if it concerns a bearing having a cup-shaped outer ring). The most simple arrangement is to provide cylindrical studs, but it should be noted that these studs could have a very slight taper or they could be provided toward their base and/or toward their upper end with an annular rim or ridge which slightly projects from the stud and helps to retain the corresponding bearing with a slightly tight fit therein which also improves the seal. The top face of the studs could be perforated if necessary.

Although specific embodiments of the invention have been described, many modifications and changes may be made therein without departing from the scope of the invention as defined in the appended claims.

Having now described my invention what I claim as new and desire to secure by Letters Patent is:

1. A package consisting of a plurality of anti-friction bearings each having an outer ring and a circular row of rolling elements adapted to roll in the outer ring; and a support carrying the bearings, the support consisting of a single sheet having a plurality of projections respectively having smooth unribbed outer cylindrical faces which are respectively directly engaged in the circular rows of rolling elements, each rolling element being in contact with the cylindrical outer face of the corresponding projection and the engagement between the cylindrical faces and the rolling elements being sufficient to detachably fix the bearings on the sheet.

2. A package as claimed in claim 1, wherein the sheet is composed of a flexible material and the projections are disposed in spaced rows, whereby the sheet can be bent and rolled in parts thereof located between the projections.

3. A package consisting of a single sheet having a plurality of hollow cylindrical projections, and a plurality of anti-friction bearings, each bearing having an outer ring and a circular row of cylindrical rolling elements engaged in the outer ring and axially inseparable from the ring, the bearings being engaged on the support by the respective direct engagement of the rows of rolling elements on the projections, the fit between the rows of rolling elements and the projections being an interference fit.

4. A package consisting of a single sheet having a plurality of substantially cylindrical projections, and a plurality of anti-friction bearings, each bearing having an outer cup-shaped ring closed at one end and a circular row of cylindrical rolling elements engaged in the outer ring, and axially inseparable from the ring, the bearings being engaged on the support by the respective direct engagement of the rows of rolling elements on the projections, the rolling elements being in contact with the respective projections, and grease sealing the space between the outer ring and the projections whereby the interior of the bearing is sealed off from the exterior and the suction effect due to the grease and closed end of the outer ring serves to retain the bearings on the projections.

5. A package as claimed in claim 4, wherein the projections are hollow and include a thin easily piercable wall, whereby the suction effect can be destroyed by piercing the thin wall and the bearings can be more easily removed from the sheet.

6. A package consisting of a plurality of anti-friction bearings consisting of an outer ring and a circular row of rolling elements adapted to roll in the outer ring and retained in the outer ring; and a support for the bearings consisting of a single sheet having a plurality of projections having faces extending into and directly engaging with an interference fit the rows of rolling elements, whereby the bearings are detachably secured to the sheet without need for further retaining means.

References Cited by the Examiner

UNITED STATES PATENTS

| 1,445,779 | 2/1923 | Mann et al. | 217—26.5 |
| 3,084,791 | 4/1963 | Hawley | 206—46 |

FOREIGN PATENTS

| 453,292 | 6/1913 | France. |

FRANKLIN T. GARRETT, *Primary Examiner.*
GEORGE O. RALSTON, *Examiner.*

UNITED STATES PATENT OFFICE
CERTIFICATE OF CORRECTION

Patent No. 3,221,874  Dated December 7, 1965

Inventor(s)  Alfred Pitner

It is certified that error appears in the above-identified patent and that said Letters Patent are hereby corrected as shown below:

In the heading, column 1, line 5, --of one-half interest-- should be inserted after "assignor".

SIGNED AND
SEALED
OCT 27 1970

(SEAL)
Attest:

Edward M. Fletcher, Jr.
Attesting Officer

WILLIAM E. SCHUYLER, JR.
Commissioner of Patents